US011814472B2

(12) United States Patent
Cushen et al.

(10) Patent No.: US 11,814,472 B2
(45) Date of Patent: Nov. 14, 2023

(54) EPOXY DUAL CURE RESINS FOR ADDITIVE MANUFACTURING

(71) Applicant: Carbon, Inc., Redwood City, CA (US)

(72) Inventors: Julia D. Cushen, San Francisco, CA (US); James Goodrich, Downington, PA (US); Jason P. Rolland, San Carlos, CA (US)

(73) Assignee: Carbon, Inc., Redwood City, CA (US)

( * ) Notice: Subject to any disclaimer, the term of this patent is extended or adjusted under 35 U.S.C. 154(b) by 203 days.

(21) Appl. No.: 17/192,768

(22) Filed: Mar. 4, 2021

(65) Prior Publication Data

US 2021/0198419 A1    Jul. 1, 2021

Related U.S. Application Data

(63) Continuation of application No. 15/754,681, filed as application No. PCT/US2016/050043 on Sep. 2, 2016, now Pat. No. 10,975,193.
(Continued)

(51) Int. Cl.
*C08G 59/68* (2006.01)
*B33Y 10/00* (2015.01)
(Continued)

(52) U.S. Cl.
CPC ............ *C08G 59/68* (2013.01); *B29C 64/124* (2017.08); *B29C 64/35* (2017.08); *B29C 71/04* (2013.01);
(Continued)

(58) Field of Classification Search
None
See application file for complete search history.

(56) References Cited

U.S. PATENT DOCUMENTS 3,051,671 A    8/1962 Cummings
3,386,955 A    6/1968 Chrobok et al.
(Continued)

FOREIGN PATENT DOCUMENTS

CN    1478219 A    2/2004
CN    101178539 A    5/2008
(Continued)

OTHER PUBLICATIONS

Chinese Office Action corresponding to CN 201680050993.0, dated Dec. 4, 2019 (14 pp, including English translation).
(Continued)

*Primary Examiner* — Jacob T Minskey
*Assistant Examiner* — Adrien J Bernard
(74) *Attorney, Agent, or Firm* — Myers Bigel, P.A.

(57) ABSTRACT

An epoxy dual cure resin useful for additive manufacturing of three-dimensional objects includes: (i) a photoinitiator; (ii) monomers and/or prepolymers that are polymerizable by exposure to actinic radiation or light; (iii) optionally, a light absorbing pigment or dye; (iv) an epoxy resin; (v) optionally, but in some embodiments preferably, an organic hardener co-polymerizable with the epoxy resin; (vi) optionally but preferably a dual reactive compound having substituted thereon a first reactive group reactive with said monomers and/or prepolymers that are polymerizable by exposure to actinic radiation or light, and a second reactive group reactive with said epoxy resin (e.g., an epoxy acrylate); (vii) optionally a diluent; (viii) optionally a filler; and (ix) optionally, a co-monomer and/or a co-prepolymer. Methods of using the same in additive manufacturing are also described.

31 Claims, 3 Drawing Sheets

Polyether amine hardener system
Without CN153 (left); with CN153 (right)

Related U.S. Application Data

(60) Provisional application No. 62/369,409, filed on Aug. 1, 2016, provisional application No. 62/270,637, filed on Dec. 22, 2015, provisional application No. 62/215,944, filed on Sep. 9, 2015.

(51) Int. Cl.

| | | |
|---|---|---|
| *B33Y 70/00* | (2020.01) | |
| *B29C 64/124* | (2017.01) | |
| *B29C 64/35* | (2017.01) | |
| *B33Y 40/20* | (2020.01) | |
| *B29C 71/04* | (2006.01) | |
| *C08J 5/00* | (2006.01) | |
| *C08L 63/00* | (2006.01) | |
| *B29K 63/00* | (2006.01) | |
| *B29K 105/00* | (2006.01) | |
| *B29K 421/00* | (2006.01) | |
| *B33Y 70/10* | (2020.01) | |

(52) U.S. Cl.
CPC .............. *B33Y 10/00* (2014.12); *B33Y 40/20* (2020.01); *B33Y 70/00* (2014.12); *C08J 5/00* (2013.01); *C08L 63/00* (2013.01); *B29K 2063/00* (2013.01); *B29K 2105/0002* (2013.01); *B29K 2421/00* (2013.01); *B29K 2995/0077* (2013.01); *B29K 2995/0089* (2013.01); *B33Y 70/10* (2020.01); *C08J 2363/00* (2013.01); *C08J 2433/08* (2013.01); *C08L 2205/03* (2013.01); *C08L 2205/05* (2013.01)

(56) References Cited

U.S. PATENT DOCUMENTS

| | | | |
|---|---|---|---|
| 3,639,928 A | 2/1972 | Bentley et al. | |
| 3,945,972 A | 3/1976 | Sakamoto | |
| 3,947,395 A | 3/1976 | Ogata et al. | |
| 4,283,520 A | 8/1981 | Moser et al. | |
| 4,436,892 A | 3/1984 | Zondler et al. | |
| 4,529,821 A | 7/1985 | Stockinger et al. | |
| 4,550,203 A | 10/1985 | Stockinger et al. | |
| 4,587,311 A | 5/1986 | Schmid et al. | |
| 4,618,712 A | 10/1986 | Stockinger et al. | |
| 4,626,642 A | 12/1986 | Wang et al. | |
| 4,694,096 A | 9/1987 | Lehmann et al. | |
| 4,785,075 A | 11/1988 | Shimp | |
| 4,800,222 A | 1/1989 | Waddill | |
| 4,833,226 A | 5/1989 | Ishimura et al. | |
| 4,859,761 A | 8/1989 | Flury et al. | |
| 5,011,635 A | 4/1991 | Murphy et al. | |
| 5,189,078 A | 2/1993 | Johnson et al. | |
| 5,198,146 A | 3/1993 | Shomer | |
| 5,236,637 A | 8/1993 | Hull | |
| 5,264,061 A | 11/1993 | Juskey et al. | |
| 5,319,004 A | 6/1994 | Marten et al. | |
| 5,418,112 A | 5/1995 | Mirle et al. | |
| 5,494,618 A | 2/1996 | Sitzmann et al. | |
| 5,510,226 A | 4/1996 | Lapin et al. | |
| 5,629,133 A | 5/1997 | Wolf et al. | |
| 5,639,413 A | 6/1997 | Crivello | |
| 5,674,921 A | 10/1997 | Regula et al. | |
| 5,679,719 A | 10/1997 | Klemarczyk et al. | |
| 5,695,708 A | 12/1997 | Karp et al. | |
| 5,973,082 A | 10/1999 | Elmore | |
| 6,309,797 B1 | 10/2001 | Grinevich et al. | |
| 6,355,763 B1 | 3/2002 | Scherzer et al. | |
| 6,566,414 B2 | 5/2003 | Takeshima et al. | |
| 6,773,754 B2 | 8/2004 | Whiter | |
| 6,881,813 B2 | 4/2005 | Hoefer et al. | |
| 7,273,580 B2 | 9/2007 | Kirsten et al. | |
| 7,438,846 B2 | 10/2008 | John | |
| 7,750,107 B2 | 7/2010 | Antelmann et al. | |
| 7,892,474 B2 | 2/2011 | Shkolnik et al. | |
| 8,383,025 B2 | 2/2013 | Li et al. | |
| 8,481,622 B2 | 7/2013 | Flanigan et al. | |
| 8,574,558 B2 | 11/2013 | Steffier | |
| 8,779,036 B2 | 7/2014 | Spyrou et al. | |
| 8,980,971 B2 | 3/2015 | Ueda et al. | |
| 9,080,007 B2 | 7/2015 | Lal et al. | |
| 9,133,301 B2 | 9/2015 | Gan et al. | |
| 9,169,386 B2 | 10/2015 | Katzakian et al. | |
| 9,205,601 B2 | 12/2015 | Desimone et al. | |
| 9,211,678 B2 | 12/2015 | Desimone et al. | |
| 9,216,546 B2 | 12/2015 | Desimone et al. | |
| 9,360,757 B2 | 6/2016 | Desimone et al. | |
| 9,453,142 B2 | 9/2016 | Rolland et al. | |
| 9,598,606 B2 | 3/2017 | Rolland et al. | |
| 9,676,963 B2 | 6/2017 | Rolland et al. | |
| 9,708,440 B2 | 7/2017 | Das et al. | |
| 9,777,097 B2 | 10/2017 | Liu et al. | |
| 9,873,761 B1 | 1/2018 | Das et al. | |
| 9,982,164 B2 | 5/2018 | Rolland et al. | |
| 10,016,938 B2 | 7/2018 | Desimone et al. | |
| 10,093,064 B2 | 10/2018 | Desimone et al. | |
| 10,144,181 B2 | 12/2018 | Desimone et al. | |
| 10,150,253 B2 | 12/2018 | Desimone et al. | |
| 10,155,882 B2 | 12/2018 | Rolland et al. | |
| 2003/0091833 A1 | 5/2003 | Baumgart et al. | |
| 2004/0052966 A1 | 3/2004 | Wilke et al. | |
| 2004/0187714 A1 | 9/2004 | Napadensky et al. | |
| 2007/0178133 A1 | 8/2007 | Rolland | |
| 2007/0205528 A1 | 9/2007 | Patel et al. | |
| 2008/0131692 A1 | 6/2008 | Rolland et al. | |
| 2010/0105794 A1 | 4/2010 | Dietliker et al. | |
| 2010/0152314 A1 | 6/2010 | Ito et al. | |
| 2012/0007287 A1 | 1/2012 | Vermeer et al. | |
| 2012/0195994 A1 | 8/2012 | El-Siblani et al. | |
| 2012/0251841 A1 | 10/2012 | Southwell et al. | |
| 2013/0292862 A1 | 11/2013 | Joyce | |
| 2013/0295212 A1 | 11/2013 | Chen et al. | |
| 2014/0199549 A1* | 7/2014 | Shin | C08L 63/00 428/402 |
| 2015/0044623 A1 | 2/2015 | Rundlett | |
| 2015/0050473 A1 | 2/2015 | Seo et al. | |
| 2015/0072293 A1 | 3/2015 | Desimone et al. | |
| 2015/0102532 A1 | 4/2015 | Desimone et al. | |
| 2015/0322291 A1 | 11/2015 | Salviato et al. | |
| 2016/0160077 A1 | 6/2016 | Rolland et al. | |
| 2016/0280864 A1 | 9/2016 | Morley et al. | |
| 2016/0333153 A1 | 11/2016 | Hirata et al. | |
| 2017/0151718 A1 | 6/2017 | Rolland et al. | |
| 2017/0239887 A1 | 8/2017 | Rolland et al. | |
| 2018/0265738 A1 | 9/2018 | Rolland et al. | |

FOREIGN PATENT DOCUMENTS

| | | | |
|---|---|---|---|
| CN | 103571211 A | 2/2014 | |
| CN | 104345562 A | 2/2015 | |
| CN | 104842565 A | 8/2015 | |
| EP | 0442071 A2 | 8/1991 | |
| EP | 0525578 A1 | 2/1993 | |
| EP | 0562826 A1 | 9/1993 | |
| EP | 0830641 A1 | 3/1998 | |
| EP | 1341039 A1 | 9/2003 | |
| EP | 1918316 A1 | 5/2008 | |
| EP | 1918316 A1 * | 5/2008 | .......... B29C 64/135 |
| EP | 2224874 B1 | 1/2014 | |
| JP | H02111528 A | 4/1990 | |
| JP | H09194540 A | 7/1997 | |
| JP | 2000007641 A | 1/2000 | |
| JP | 2015036420 A | 2/2015 | |
| WO | 9207705 A1 | 5/1992 | |
| WO | 9600412 A1 | 1/1996 | |
| WO | 0126023 A1 | 4/2001 | |
| WO | 2005052021 A1 | 6/2005 | |
| WO | 2006045002 A2 | 4/2006 | |
| WO | 2013021039 A1 | 2/2013 | |
| WO | 2015002071 A1 | 1/2015 | |
| WO | 2015077419 A1 | 5/2015 | |
| WO | WO2015077419 A1 * | 5/2015 | ............ B32B 27/06 |
| WO | 2015094629 A1 | 6/2015 | |

(56) References Cited

FOREIGN PATENT DOCUMENTS

| WO | 2015200173 | A1 | 12/2015 | | |
|---|---|---|---|---|---|
| WO | 2016145050 | A1 | 9/2016 | | |
| WO | WO2016145050 | | * | 9/2016 | ........ B01L 3/502707 |

OTHER PUBLICATIONS

European Examination Report corresponding to EP 16766749.2, dated Jan. 24, 2019 (4 pp).
International Search Report and Written Opinion corresponding to PCT/US2016/050043; dated Oct. 28, 2016 (12 pages).
Japanese Office Action corresponding to JP 2018-512552; dated Oct. 16, 2020 (11 pages, including English translation).
Third Party Observations, EP 16766749.2, dated Jan. 28, 2020 (5 pp).
Kersting, Daniel , et al., "Evaluation of the use of inorganic pigments and fillers in cure of epoxy resins by microwave irradiation", INAC 2013: International nuclear Atlantic Conference, de Janeiro, Brazil, Nov. 24-29, 2013, 2013, 13 pp.
Malik, Jitendra , et al., "A thermally reworkable UV curable acrylic adhesive prototype", International Journal of Adhesion & Adhesives, 22(4), 2020, 283-289.
Malik, Jitendra , et al., "Comparative Study of Novel Polymer Prototype for Controlled Thermally Reworkable UV Curable Acrylic Adhesives in Absence and Presence of Reactive Diluent", Surface Engineering, 19(2), 2003, 121-126.
Malik, Jitendra , et al., "Computational study of thermally controlled polymer network disassembly via the incorporation of sterically hindered urea linkages", Polymer, 43(8), 2002, 2561-2567.
Malik, Jitendra , et al., "The thermally controlled molecular disassembly properties of a polymer network via the incorporation of one sterically hindered urea linkage", Polymer Degradation and Stability, 76(2), 2002, 241-249.
Malik, Jitendra , et al., "Thermally Controlled Molecular Disassembly of a Crosslinked Polymer Network by the Incorporation of Sterically Hindered Urea Linkages", Journal of Applied Polymer Science, 85(4), 2002, 856-864.
Pan, Yayue , et al., "A Fast Mask Projection Stereolithography Process for Fabricating Digital Models in Minutes", J. Manufacturing Sci. and Eng. 134(5), 2012, 051011-1-9.
Park, Young-Jun, , et al., ", "UV- and thermal-curing behaviors of dual-curable adhesives based on epoxy acrylate oligomer," International Journal of Adhesion and Adhesives, 2009, pp. 710-717."
Stemmelen, Mylene , et al., "A Fully Biobased Epoxy Resin from Vegetable Oils: From the Synthesis of the Precursors by Thiol-ene Reaction to the Study of the Final Material", Journal of Polymer Science Part A: Polymer Chemistry, Wiley, 49 (11), 2011, 2434-2444.
Sun, Xiao Feng , et al., "Study on the Properties of Microwave Curing Epoxy Resin/Nano-Fe Composite Materials", Applied Mechanics and Materials 26-28, 2010, 356-359.
Tumbleston, John R., et al., "Continuous liquid interface production of 3D Objects", Science, 347(6228), 2015, 1349-1352.
Velankar, Sachin , et al., "High-Performance UV-Curable Urethane Acrylates via Deblocking Chemistry", Journal of Applied Polymer Science, 62(9), 1996, 1361-1376.

* cited by examiner

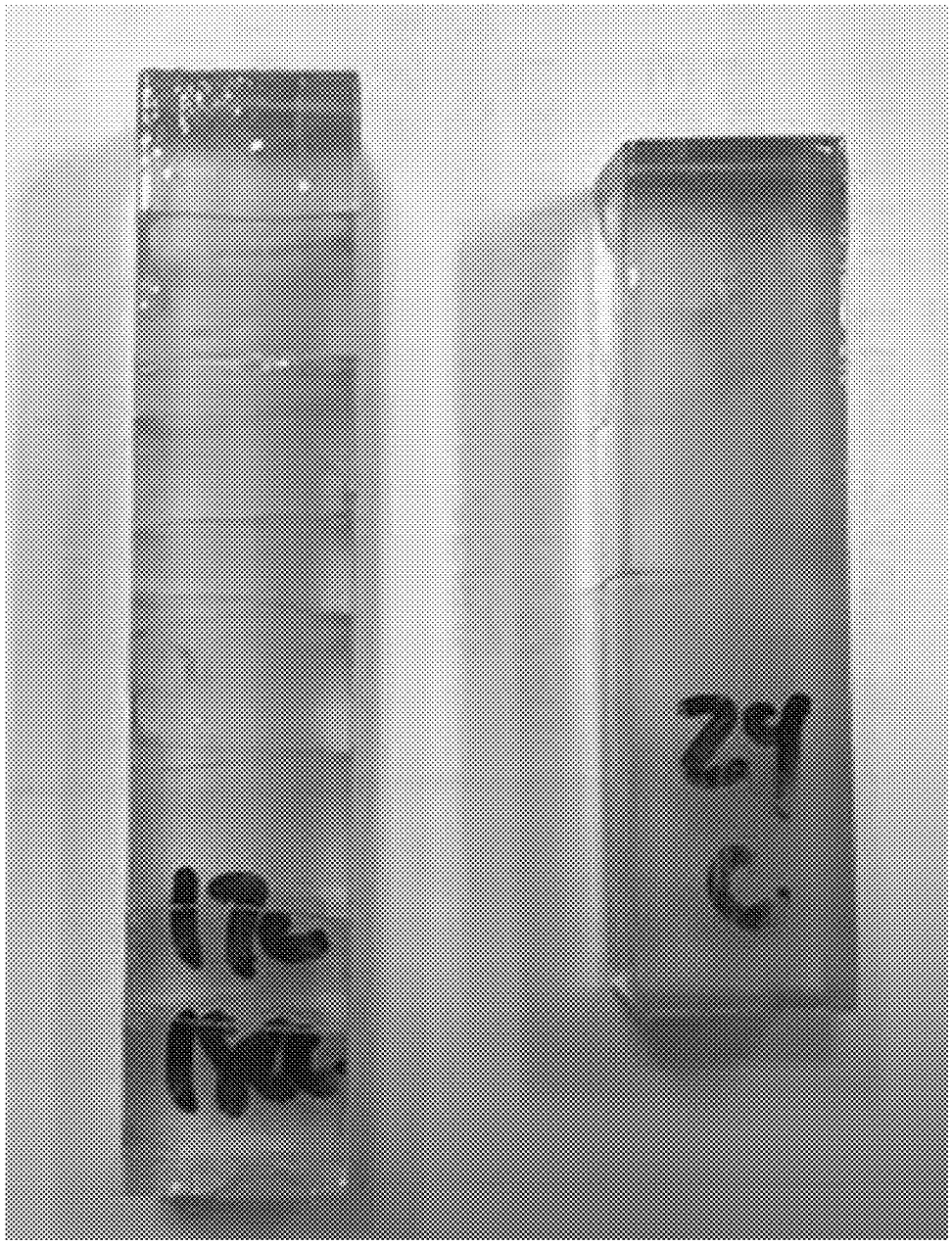
Figure 1: Aromatic amine hardener system
Without CN153 (top); With CN153 (bottom)

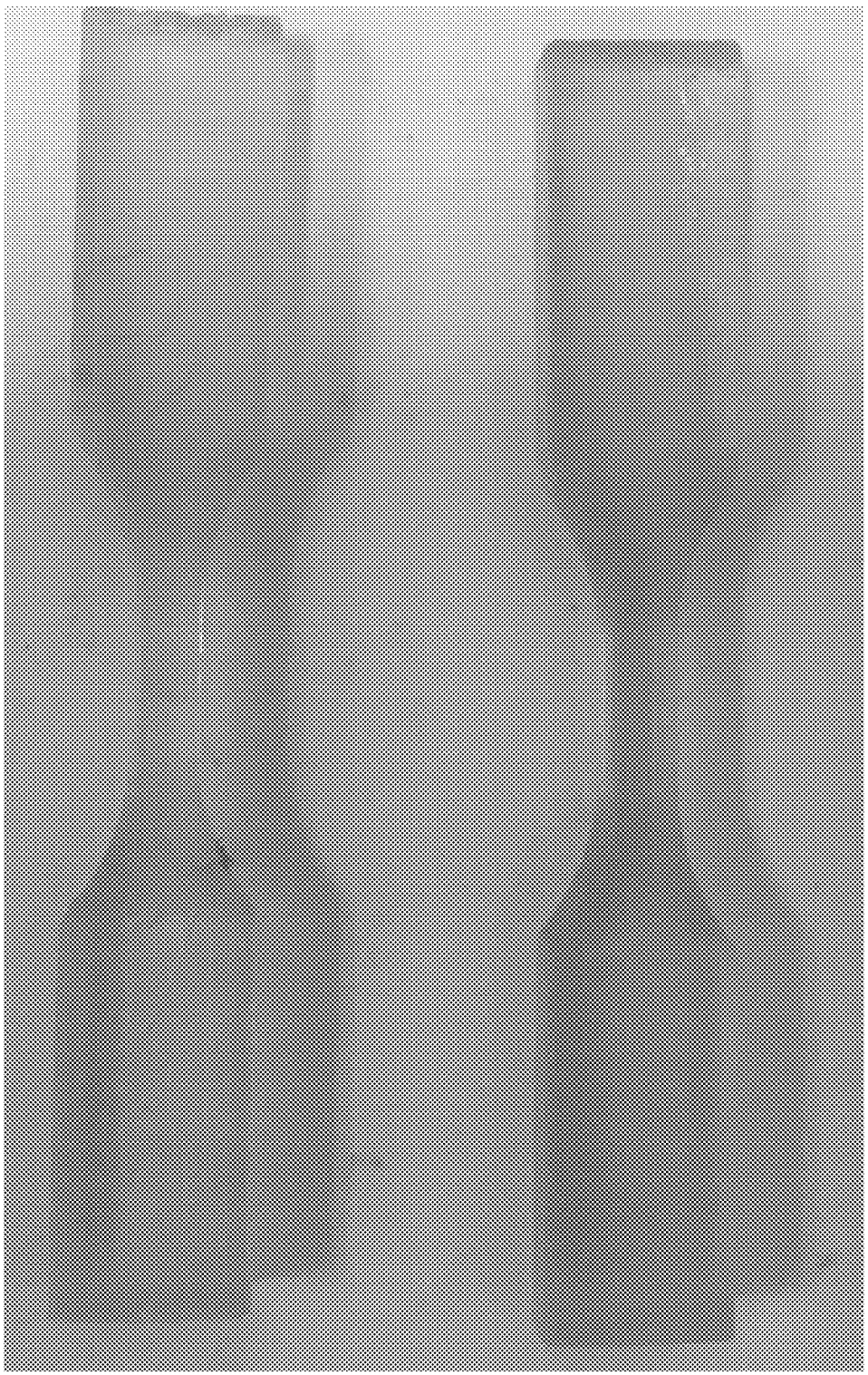
Figure 2: Anhydride hardener system
Without CN153 (top); With CN153 (bottom)

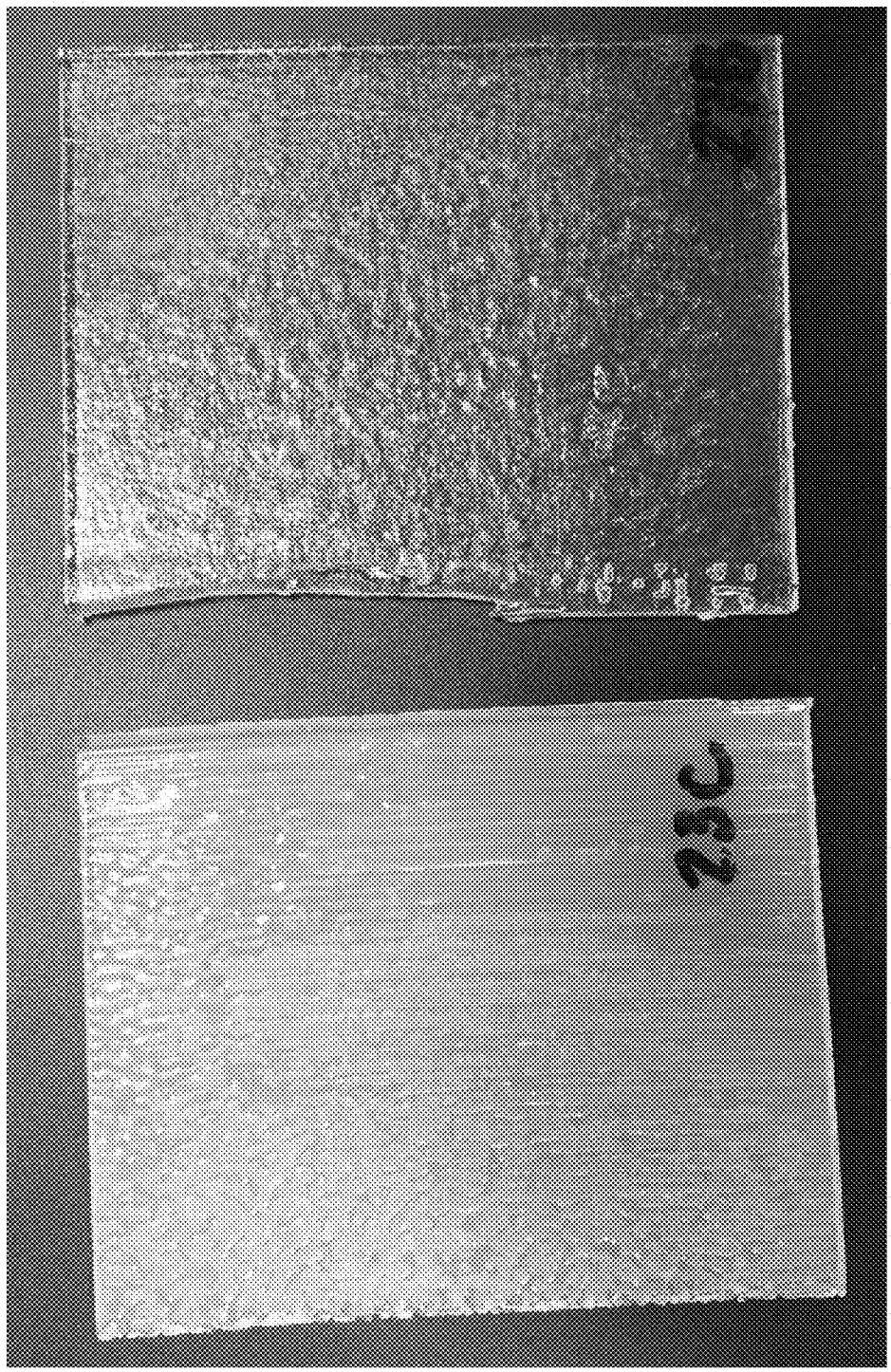
Figure 3: Polyether amine hardener system Without CN153 (left); with CN153 (right)

EPOXY DUAL CURE RESINS FOR ADDITIVE MANUFACTURING

RELATED APPLICATIONS

This application is a continuation of U.S. patent application Ser. No. 15/754,681, filed Feb. 23, 2018, which is a 35 U.S.C. § 371 national phase entry of International Application No. PCT/US2016/050043, filed Sep. 2, 2016, and which claims the benefit of U.S. Provisional Patent Application Ser. No. 62/215,944 filed Sep. 9, 2015, 62/270,637 filed Dec. 22, 2015, and 62/369,409 filed Aug. 1, 2016, the disclosures of which are incorporated by reference herein in their entirety.

FIELD OF THE INVENTION

The present invention concerns materials, methods and apparatus for the fabrication of solid three-dimensional objects from liquid materials, and objects so produced.

BACKGROUND OF THE INVENTION

In conventional additive or three-dimensional fabrication techniques, construction of a three-dimensional object is performed in a step-wise or layer-by-layer manner. In particular, layer formation is performed through solidification of photo curable resin under the action of visible or UV light irradiation. Two techniques are known: one in which new layers are formed at the top surface of the growing object; the other in which new layers are formed at the bottom surface of the growing object. An early example is Hull, U.S. Pat. No. 5,236,637. Other approaches are shown in U.S. Pat. Nos. 7,438,846, 7,892,474; M. Joyce, US Patent App. 2013/0292862; Y. Chen et al., US Patent App. 2013/0295212 (both Nov. 7, 2013); Y. Pan et al., *J. Manufacturing Sci. and Eng.* 134, 051011-1 (October 2012), and numerous other references. Materials for use in such apparatus are generally limited, and there is a need for new resins which will provide diverse material properties for different product families if three-dimensional fabrication is to achieve its full potential.

Southwell, Xu et al., US Patent Application Publication No. 2012/0251841, describe liquid radiation curable resins for additive fabrication, but these comprise a cationic photoinitiator (and hence are limited in the materials which may be used) and are suggested only for layer by layer fabrication. See also U.S. Pat. No. 8,980,971 to Ueda (DSM).

Velankar, Pazos, and Cooper, *Journal of Applied Polymer Science* 162, 1361 (1996), describe UV-curable urethane acrylates formed by a deblocking chemistry, but they are not suggested for additive manufacturing, and no suggestion is made on how those materials may be adapted to additive manufacturing.

SUMMARY OF THE INVENTION

Accordingly, described herein is a method of forming a three-dimensional object is described herein. The method generally comprises:
(a) providing an epoxy dual cure resin (sometimes also referred to herein as a "polymerizable liquid");
(b) forming a three-dimensional intermediate from said resin, where said intermediate has the shape of, or a shape to be imparted to, said three-dimensional object, and where said resin is solidified by exposure to light; then
(c) optionally, but in some embodiments preferably, washing the three dimensional intermediate, and then
(d) heating and/or microwave irradiating said three-dimensional intermediate sufficiently to further cure said resin and form said three-dimensional object;
wherein said epoxy dual cure resin comprises:
(i) a photoinitiator;
(ii) monomers and/or prepolymers that are polymerizable by exposure to actinic radiation or light;
(iii) optionally, a light absorbing pigment or dye;
(iv) an epoxy resin;
(v) optionally, but in some embodiments preferably, an organic hardener co-polymerizable with said epoxy resin;
(vi) optionally, but preferably, a dual reactive compound having substituted thereon a first reactive group reactive with said monomers and/or prepolymers that are polymerizable by exposure to actinic radiation or light, and a second reactive group reactive with said epoxy resin;
(vii) optionally a diluent;
(viii) optionally a filler (e.g., silica, a toughener such as a core-shell rubber, etc., including combinations thereof); and
(ix) optionally, a co-monomer and/or a co-prepolymer.

Resins useful for carrying out such methods, and products produced from such methods, are also described.

In some embodiments, a Lewis acid or an oxidizable tin salt is included in the polymerizable liquid or resin (e.g., in an amount of from 0.01 or 0.1 to 1 or 2 percent by weight, or more) in an amount effective to accelerate the formation of the three-dimensional intermediate object during the production thereof.

In some embodiments of the methods and compositions described above and below, the polymerizable liquid (or "dual cure resin") has a viscosity of 100, 200, 500 or 1,000 centipoise or more at room temperature and/or under the operating conditions of the method, up to a viscosity of 10,000, 20,000, or 50,000 centipoise or more, at room temperature and/or under the operating conditions of the method.

The resins and methods described herein are particularly useful for forming three-dimensional objects that are rigid, exhibit high tensile strength, exhibit high scratch resistance, exhibit a high glass transition temperature, provide good chemical resistance, and/or are good insulators (e.g., for electrical applications).

In some embodiments, polymerizable liquids used in the present invention include a non-reactive pigment or dye. Examples include, but are not limited to, (i) titanium dioxide (e.g., in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxyphenyltriazine, and/or benzotriazole ultraviolet light absorber (e.g. in an amount of 0.001 or 0.005 to 1, 2 or 4 percent by weight).

Non-limiting examples and specific embodiments of the present invention are explained in greater detail in the specification set forth below. The disclosures of all United States Patent references cited herein are to be incorporated herein by reference in their entirety.

BRIEF DESCRIPTION OF THE DRAWINGS

FIG. 1: Results with an aromatic amine hardener system without CN153 (top), and with CN153 (bottom).

FIG. 2: Results with an anhydride hardener system without CN153 (top), and with CN153 (bottom).

FIG. 3: Results with a polyether amine hardener system without CN153 (left), and with CN153 (right).

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

"Shape to be imparted to" refers to the case where the shape of the intermediate object slightly changes between formation thereof and forming the subsequent three-dimensional product, typically by shrinkage (e.g., up to 1, 2 or 4 percent by volume), expansion (e.g., up to 1, 2 or 4 percent by volume), removal of support structures, or by intervening forming steps (e.g., intentional bending, stretching, drilling, grinding, cutting, polishing, or other intentional forming after formation of the intermediate product, but before formation of the subsequent three-dimensional product).

1. Resins.

As noted above, the present invention includes epoxy dual cure resin compositions useful for additive manufacturing. Such compositions comprise, consist of, or consist essentially of:

(i) a photoinitiator;
(ii) monomers and/or prepolymers that are polymerizable by exposure to actinic radiation or light;
(iii) optionally, a light absorbing pigment or dye;
(iv) an epoxy resin;
(v) optionally, but in some embodiments preferably, an organic hardener co-polymerizable with said epoxy resin;
(vi) optionally but preferably a dual reactive compound having substituted thereon a first reactive group reactive with said monomers and/or prepolymers that are polymerizable by exposure to actinic radiation or light, and a second reactive group reactive with said epoxy resin;
(vii) optionally a diluent;
(viii) optionally a filler; and
(ix) optionally, a co-monomer and/or a co-prepolymer.

In some embodiments, the epoxy resin comprises a bisphenol A epoxy resin, a bisphenol F epoxy resin, a novolac epoxy resin, an aliphatic epoxy resin, a glycidylamine epoxy resin, or a combination thereof. In some embodiments, the epoxy resin comprises an epoxy compound having at least two epoxy groups; in other embodiments epoxy resin can comprise and epoxy compound having a single epoxy group, for example as a reactive diluent. Numerous examples of suitable epoxy resins (and organic hardeners) are known. See, e.g., U.S. Pat. Nos. 3,945,972; 3,947,395, 4,833,226; 5,319,004; 6,355,763; 6,881,813; 8,383,025; 9,133,301; etc.

In some embodiments, the epoxy resin comprises an epoxidized vegetable oil. In general, epoxidized vegetable oils can be obtained by the epoxidation of triglycerides of unsaturated fatty acids. They are made by epoxidizing the reactive olefin groups of the naturally occurring triglyceride oils. The olefin groups can be epoxidized with peracids, such as perbenzoic, peracetic and the like, and with hydrogen peroxide. Suitable epoxidized vegetable oils are epoxidized linseed oil, epoxidized soybean oil, epoxidized corn oil, epoxidized cottonseed oil, epoxidized perilla oil, epoxidized safflower oil, etc. See, e.g., U.S. Pat. Nos. 3,051,671; 5,973,082; 8,481,622; and 9,169,386; see also M. Stemmelen et al., A fully biobased epoxy resin from vegetable oils: From the synthesis of the precursors by thiol-ene reaction to the study of the final material, *J. Polym Sci. Part A: Polym Chem.* 49, 2434-2444 (2011).

In some embodiments, the epoxy resin comprises a catalyzed epoxy resin (which may not require a hardener). In such case, the resin may further include an epoxy homopolymerization catalyst, such as a tertiary amine or imidizole (anionic polymerization) or boron trifluoride (cationic polymerizations).

Any suitable hardener may be used (see references cited in connection with epoxy resins above). In some embodiments, the hardener comprises an amine or polyamine (e.g., an aromatic amine or polyamine, a cycloaliphatic amine or polyamine, an aliphatic amine or polyamine such as a polyether amine, etc.).

In some embodiments, the hardener comprises an acid or polyacid (i.e., polycarboxylic acids), a phenol or polyphenol, an alcohol or polyol, or a thiol or polythiol.

In some embodiments, the hardener comprises an anhydride, such as a linear or cyclic anhydride, including compounds having more than one anhydride group (for example, at least one of polysebacic or polyazelaic anhydride; methyltetrahydrophthalic anhydride, tetrahydro phthalic anhydride, methyl nadic anhydride, hexahydro phthalicanhydride, and methylhexahydro phthalic anhydride; succinic anhydride, substituted succinic anhydride, citric acid anhydride, maleic anhydride, adducts of maleic anhydride, dodecyl succinic anhydride, maleic anhydride vinyl and styrene copolymers of maleic anhydride, multi-ring alicyclic anhydrides, phthalic anhydride, and/or trimellitic anhydride (See, e.g., U.S. Pat. No. 9,080,007)).

Latent hardeners. In some embodiments, the hardener comprises a latent hardener (including mixtures thereof): That is, a hardener having a low reactivity at lower temperatures, and/or which is sparingly soluble at lower temperatures, such that the hardener can be more stable at room temperature, but then activated upon heating. Numerous examples of latent hardeners are known (See, e.g., U.S. Pat. No. 8,779,036; see also U.S. Pat. No. 4,859,761. Particular examples include substituted guanidines and aromatic amines, such as dicyandiamide, benzoguanamine, o-tolylbiguanidine, bis(4-aminophenyl) sulfone (also known as diamino diphenylsulfone: DDS), bis(3-aminophenyl) sulfone, 4,4'-methylenediamine, 1,2- or 1,3- or 1,4-benzenediamines, bis(4-aminophenyl)-1,4-diisopropylbenzene (e.g. EPON 1061 from Shell), bis(4-amino-3,5-dimethylphenyl)-1,4-diisopropylbenzene (e.g. EPON 1062 from Shell), bis(aminophenyl) ether, diaminobenzophenones, 2,6-diaminopyridine, 2,4-toluenediamine, diaminodiphenylpropanes, 1,5-diaminonaphthalene, xylenediamines, 1,1-bis-4-aminophenyl-cyclohexane, methylenebis(2,6-diethylaniline) (e.g. LONZACURE M-DEA from Lonza), methylenebis(2-isopropyl-6-methylaniline) (e.g. LONZACURE M-MIPA from Lonza), methylenebis(2,6-diisopropylaniline) (e.g. LONZACURE M-DIPA from Lonza), 4-aminodiphenylamine, diethyltoluenediamine, phenyl-4,6-diaminotriazine, and lauryl-4,6-diaminotriazine. Still other examples include N-acylimidazoles such as 1-(2',4',6'-trimethylbenzoyl)-2-phenylimidazole or 1-benzoyl-2-isopropylimidazole (see, e.g., U.S. Pat. Nos. 4,436,892 and 4,587,311); Cyanoacetyl compounds such as neopentyl glycol biscyanoacetate, N-isobutylcyanoacetamide, 1,6-hexamethylene biscyanoacetate or 1,4-cyclohexanedimethanol biscyanoacetate (see, e.g., U.S. Pat. No. 4,283,520); N-cyanoacylamide compounds such as N,N'-dicyanoadipic diamide (see, e.g., U.S. Pat. Nos. 4,529,821, 4,550,203, and 4,618,712; acylthiopropylphenols (see, e.g., U.S. Pat. No. 4,694,096) and the urea derivatives such as toluene-2,4-bis(N,N-dimethylcarbamide) (see, e.g., U.S. Pat. No. 3,386,955); and aliphatic or cycloaliphatic diamines and polyamines if they are sufficiently unreactive. An example which may be included here is polyetheramines, e.g. JEFFAMINE 230 and 400. Aliphatic or cycloaliphatic diamines or polyamines whose reactivity has been reduced by steric and/or electronic influencing factors or/and are sparingly soluble or have a high melting point, e.g. JEFFLINK 754 (Huntsman) or CLEARLINK 1000 (Dorf Ketal) can also be used.

Epoxy accelerator. An accelerator (or mixture of accelerators) may optionally be included in the polymerizable liquid, examples of which include but are not limited to those set forth in U.S. Pat. Nos. 9,080,007; 8,779,036; 7,750,107; 6,773,754; 5,198,146; 4,800,222; and 3,639,928.

In some embodiments, the monomers and/or prepolymers polymerizable by exposure to actinic radiation or light are those comprising reactive end groups selected from the group consisting of acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers. (See, e.g., US Patent Application Publication No. 2015/0072293 to DeSimone et al. see also: Rolland et al., Three dimensional objects produced from materials having multiple mechanisms of hardening, US Patent Application Pub. No. 2016016077 (9 Jun. 2016) (also published as PCT Patent Application Pub. No. WO2015/200189); Rolland et al., Methods of producing three dimensional objects from materials having multiple mechanisms of hardening US Patent Application Pub. No. 20160136889 (19 May 2016) (also published as PCT Patent Application Pub. No. WO2015/200173); Rolland et al., Methods of producing polyurethane three-dimensional objects from materials having multiple mechanisms of hardening US Patent Application Pub. No. 20160137838 (19 May 2016) (also published as PCT Patent Application Pub. No. WO2015/200179); and Rolland et al., Polyurethane resins having multiple mechanisms of hardening for use in producing three-dimensional objects US Patent Application Pub. No. 20160137839 (19 May 2016) (also published as PCT Patent Application Pub. No. WO2015/200201), the disclosures of all of which are incorporated by reference herein in their entirety. In some embodiments, acrylated or methacrylated vegetable oils may be employed; in some embodiments, acrylated or methacrylated polyols (e.g., sucrose polyesters such as SEFOSE™ brand sucrose polyester) may be used as the monomers and/or prepolymers polymerizable by exposure to actinic radiation or light. See, e.g., U.S. Pat. No. 8,574,558.

Dual reactive compound. As noted above, in some embodiments a dual reactive compound is included in the polymerizable liquid. In general, such a dual reactive compound comprises: (i) a first reactive group reactive with (i.e., preferentially reactive with) the monomers and/or prepolymers that are polymerizable by exposure to actinic radiation or light, and (ii) a second reactive group reactive with (i.e., preferentially reactive with) the epoxy resin. One or more of each reactive groups may be included.

Examples of suitable first reactive groups include, but are not limited to, acrylates, methacrylates, α-olefins, N-vinyls, acrylamides, methacrylamides, styrenics, thiols, 1,3-dienes, vinyl halides, acrylonitriles, vinyl esters, maleimides, and vinyl ethers.

Examples of suitable second reactive groups include, but are not limited to, epoxy, amine, isocyanate, alcohol, and anhydride groups.

Thus, particular examples of suitable dual reactive compounds include compounds of the general formula $(X)_n R (X')_m$, wherein: X is the first reactive group, X' is the second reactive group, n and m are each integers of from 1 or 2 to 10 or 20, and R is a hydrocarbyl or organic group (e.g., an aromatic, aliphatic, or mixed aromatic and aliphatic group, such as bis-phenol a). Particular examples include but are not limited to epoxy acrylates and epoxy methacrylates, such as compounds of Formula I:

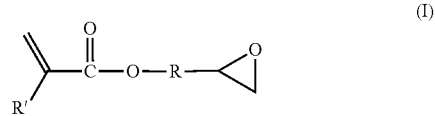

(I)

where R' is H or $CH_3$ and R is as given above. R may be as short as —$CH_2$— (e.g., glicidyl methacrylate), or may be a long chain organic polymer itself. See, e.g., U.S. Pat. No. 8,383,025 at column 4.

Lewis acids and oxidizable tin salts. In some embodiments, a Lewis acid or an oxidizable tin salt is included in the polymerizable liquid (e.g., in an amount of from 0.01 or 0.1 to 1 or 2 percent by weight, or more) in an amount effective to accelerate the formation of the three-dimensional intermediate object during the production thereof. Oxidizable tin salts useful for carrying out the present invention include, but are not limited to, stannous butanoate, stannous octoate, stannous hexanoate, stannous heptanoate, stannous linoleate, stannous phenyl butanoate, stannous phenyl stearate, stannous phenyl oleate, stannous nonanoate, stannous decanoate, stannous undecanoate, stannous dodecanoate, stannous stearate, stannous oleate stannous undecenoate, stannous 2-ethylhexoate, dibutyl tin dilaurate, dibutyl tin dioleate, dibutyl tin distearate, dipropyl tin dilaurate, dipropyl tin dioleate, dipropyl tin distearate, dibutyl tin dihexanoate, and combinations thereof. See also U.S. Pat. Nos. 5,298,532; 4,421,822; and 4,389,514, the disclosures of which are incorporated herein by reference. In addition to the foregoing oxidizable tin salts, Lewis acids such as those described in Chu et al. in Macromolecular Symposia, Volume 95, Issue 1, pages 233-242, June 1995 are known to enhance the polymerization rates of free-radical polymerizations and are included herein by reference.

Fillers. Any suitable filler may be used in connection with the present invention, depending on the properties desired in the part or object to be made. Thus, fillers may be solid or liquid, organic or inorganic, and may include reactive and non-reactive rubbers: siloxanes, acrylonitrile-butadiene rubbers; reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners. One or more polymeric and/or inorganic tougheners can be used as a filler in the present invention. See generally US Patent Application Publication No. 20150215430. The toughener may be uniformly distributed in the form of particles in the cured product. The particles could be less than 5 microns (um) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization. Examples of block copolymers include the copolymers whose composition is described in U.S. Pat. No. 6,894,113 (Court et al., Atofina, 2005) and include "NANOSTRENTH®™" SBM (polystyrene-polybutadiene-polymethacrylate), and AMA (polymethacrylate-polybutylacrylate-polymethacrylate), both produced by Arkema. Other suitable block copolymers include FORTEGRA®™ and the amphiphilic block copolymers described in U.S. Pat. No. 7,820,760B2, assigned to Dow Chemical. Examples of known core-shell particles include the core-shell (dendrimer) particles whose compositions are described in US20100280151A1 (Nguyen et al., Toray Industries, Inc., 2010) for an amine branched polymer as a shell grafted to a core polymer polymerized from polymerizable monomers containing unsaturated carbon-carbon bonds, core-shell rubber particles whose compositions are described in EP 1632533A1 and EP 2123711A1 by Kaneka Corporation, and the "KaneAce MX" product line of such particle/epoxy blends whose particles have a polymeric core polymerized from polymerizable monomers such as butadiene, styrene, other unsaturated carbon-carbon bond monomer, or their combinations, and a polymeric shell compatible with the epoxy, typically polymethylmethacrylate, polyglycidylmethacrylate, polyacrylonitrile or similar polymers, as discussed further below. Also suitable as block copolymers in the present invention are the "JSR SX" series of carboxylated polystyrene/polydivinylbenzenes produced by JSR Corporation; "Kureha Paraloid" EXL-2655 (produced by Kureha Chemical Industry Co., Ltd.), which is a butadiene alkyl methacrylate styrene copolymer; "Stafiloid" AC-3355 and TR-2122 (both produced by Takeda Chemical Industries, Ltd.), each of which are acrylate methacrylate copolymers; and "PARALOID" EXL-2611 and EXL-3387 (both produced by Rohm & Haas), each of which are butyl acrylate methyl methacrylate copolymers. Examples of suitable oxide particles include NANOPDX®™ produced by nanoresins AG. This is a master blend of functionalized nanosilica particles and an epoxy.

Core-shell rubbers. Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere.

In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle.

In some embodiments, the rubbery core can have a Tg of less than −25° C., more preferably less than −50° C., and even more preferably less than −70° C. The Tg of the rubbery core may be well below −100° C. The core-shell rubber also has at least one shell portion that preferably has a Tg of at least 50° C. By "core," it is meant an internal portion of the core-shell rubber. The core may form the center of the core-shell particle, or an internal shell or domain of the core-shell rubber. A shell is a portion of the core-shell rubber that is exterior to the rubbery core. The shell portion (or portions) typically forms the outermost portion of the core-shell rubber particle. The shell material can be grafted onto the core or is cross-linked. The rubbery core may constitute from 50 to 95%, or from 60 to 90%, of the weight of the core-shell rubber particle.

The core of the core-shell rubber may be a polymer or copolymer of a conjugated diene such as butadiene, or a lower alkyl acrylate such as n-butyl-, ethyl-, isobutyl- or 2-ethylhexylacrylate. The core polymer may in addition contain up to 20% by weight of other copolymerized monounsaturated monomers such as styrene, vinyl acetate, vinyl chloride, methyl methacrylate, and the like. The core polymer is optionally cross-linked. The core polymer optionally contains up to 5% of a copolymerized graft-linking monomer having two or more sites of unsaturation of unequal reactivity, such as diallyl maleate, monoallyl fumarate, allyl methacrylate, and the like, at least one of the reactive sites being non-conjugated.

The core polymer may also be a silicone rubber. These materials often have glass transition temperatures below −100° C. Core-shell rubbers having a silicone rubber core include those commercially available from Wacker Chemie, Munich, Germany, under the trade name Genioperl.

The shell polymer, which is optionally chemically grafted or cross-linked to the rubber core, can be polymerized from at least one lower alkyl methacrylate such as methyl methacrylate, ethyl methacrylate or t-butyl methacrylate. Homopolymers of such methacrylate monomers can be used. Further, up to 40% by weight of the shell polymer can be formed from other monovinylidene monomers such as styrene, vinyl acetate, vinyl chloride, methyl acrylate, ethyl acrylate, butyl acrylate, and the like. The molecular weight of the grafted shell polymer can be between 20,000 and 500,000.

One suitable type of core-shell rubber has reactive groups in the shell polymer which can react with an epoxy resin or an epoxy resin hardener. Glycidyl groups are suitable. These can be provided by monomers such as glycidyl methacrylate.

One example of a suitable core-shell rubber is of the type described in US Patent Application Publication No. 2007/0027233 (EP 1 632 533 A1). Core-shell rubber particles as described therein include a cross-linked rubber core, in most cases being a cross-linked copolymer of butadiene, and a shell which is preferably a copolymer of styrene, methyl methacrylate, glycidyl methacrylate and optionally acrylonitrile. The core-shell rubber is preferably dispersed in a polymer or an epoxy resin, also as described in the document.

Suitable core-shell rubbers include, but are not limited to, those sold by Kaneka Corporation under the designation Kaneka Kane Ace, including the Kaneka Kane Ace 15 and 120 series of products, including Kanaka Kance Ace MX 120, Kaneka Kane Ace MX 153, Kaneka Kane Ace MX 154, Kaneka Kane Ace MX 156, Kaneka Kane Ace MX170, and Kaneka Kane Ace MX 257 and Kaneka Kane Ace MX 120 core-shell rubber dispersions, and mixtures thereof.

In some embodiments, the light absorbing pigment or dye is:

(i) titanium dioxide (e.g., in an amount of from 0.05 or 0.1 to 1 or 5 percent by weight), (ii) carbon black (e.g., in an amount of from 0.05 or 0.1 to 1 or 5 percent by weight), and/or (iii) an organic ultraviolet light absorber (e.g., a hydroxybenzophenone, hydroxyphenylbenzotriazole, oxanilide, benzophenone, thioxanthone, hydroxyphenyltriazine, and/or benzotriazole ultraviolet light absorber) (e.g., in an amount of 0.001 or 0.005 to 1 or 2 percent by weight).

In some embodiments, the diluent comprises an acrylate, a methacrylate, a styrene, an acrylic acid, a vinylamide, a vinyl ether, a vinyl ester, polymers containing any one or more of the foregoing, and combinations of two or more of the foregoing.

Microwave absorbing materials. In some embodiments, the polymerizable liquid contains a microwave absorbing, or microwave dissipative, materials. Such materials are generally particles, and in some cases nanoparticles. Such materials are known. See, e.g., U.S. Pat. No. 5,189,078; see also U.S. Pat. Nos. 6,566,414, 7,273,580, 4,626,642; and PCT Patent Application WO 2013/021039. Particular examples of suitable materials include, but are not limited to, iron, tungsten, chromium, aluminum, copper, titanium, titanium nitride, molybdenum disilicide, nickel, and carbon (including graphite). Suitable spherical substrates include ceramics (including glass), metals and polymers. In some embodiments, the particles may range in diameter from 0.1 to 150 microns. One type of particles is acicular magnetic metallic polycrystalline filaments which have an average length of about 10 microns or less, diameters of about 0.1 micron or more, and aspect ratios between 50:1 and 10:1, Other suitable particles are based on iron oxide filaments: ferric oxide itself; ferrosoferric oxide having a thin surface layer of adsorbed cobalt, with x between 1.0 and 1.5 and the surface cobalt providing one to ten percent of the particle weight, in acicular form of length 0.4 micron and aspect ratio about 6:1 to 8:1; or similarly shaped and sized ferric oxide filaments having a thin surface layer of adsorbed cobalt and doubly ionized iron atoms. In some embodiments, the microwave absorbing material may comprise iron nanoparticles. See, e.g., X. F. Sun et al., *Study on the Properties of Microwave Curing Epoxy Resin/Nano-Fe Composite Materials*, Applied Mechanics and Materials 26-28, pp. 356-359 (2010). In some embodiments, the microwave absorbing material may comprise an inorganic pigment and/or filler. See, e.g., D. Kersting and H. Wiebeck, *Evaluation of the use of inorganic pigments and fillers in cure of epoxy resins by microwave irradiation*, 2013 International Nuclear Atlantic Conference—INAC 2013.

When present, microwave absorbing materials such as described above may be included in the resin composition, for both the photopolymerization step and the microwave/heat polymerization step, in any suitable amount, typically from 0.1 or 1 to 5, 10 or 20 percent by weight, or more.

In some embodiments, the polymerizable liquid comprises:

(i) from 0.1 to 4 percent by weight of said photoinitiator, (ii) from 10 to 90 percent by weight of said monomers and/or prepolymers that are polymerizable by exposure to actinic radiation or light, (iii) from 0.1 to 2 percent by weight of said light absorbing pigment or dye when present, (iv) from 2, 5 or 10 to 50 or 60 percent by weight of said epoxy resin;

(v) from 1 or 2 to 30 or 40 percent by weight of said organic hardener when present;

(vi) from 1 or 2 to 30 or 40 percent by weight of said dual reactive compound, when present;

(vii) from 1 or 2 to 30 or 40 percent by weight of said diluent when present; and (viii) from 1 or 2 to 20, 30 or 50 percent by weight of said filler when present.

2. Methods.

The three dimensional intermediate is preferably formed from resins as described above by additive manufacturing, typically bottom-up or top-down additive manufacturing. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication Nos. 2013/0292862 to Joyce and 2013/0295212 to Chen et al., and PCT Application Publication No. WO 2015/164234 to Robeson et al. The disclosures of these patents and applications are incorporated by reference herein in their entirety.

In general, top-down three-dimensional fabrication is carried out by:

(a) providing a polymerizable liquid reservoir having a polymerizable liquid fill level and a carrier positioned in the reservoir, the carrier and the fill level defining a build region therebetween;

(b) filling the build region with a polymerizable liquid (i.e., the resin), said polymerizable liquid comprising a mixture of (i) a light (typically ultraviolet light) polymerizable liquid first component, and (ii) a second solidifiable component of the dual cure system; and then (c) irradiating the build region with light to form a solid polymer scaffold from the first component and also advancing (typically lowering) the carrier away from the build surface to form a three-dimensional intermediate having the same shape as, or a shape to be imparted to, the three-dimensional object and containing said second solidifiable component (e.g., a second reactive component) carried in the scaffold in unsolidified and/or uncured form.

A wiper blade, doctor blade, or optically transparent (rigid or flexible) window, may optionally be provided at the fill level to facilitate leveling of the polymerizable liquid, in accordance with known techniques. In the case of an optically transparent window, the window provides a build surface against which the three dimensional intermediate is formed, analogous to the build surface in bottom-up three dimensional fabrication as discussed below.

In general, bottom-up three dimensional fabrication is carried out by:

(a) providing a carrier and an optically transparent member having a build surface, the carrier and the build surface defining a build region therebetween;

(b) filling the build region with a polymerizable liquid (i.e., the resin), said polymerizable liquid comprising a mixture of (i) a light (typically ultraviolet light) polymerizable liquid first component, and (ii) a second solidifiable component of the dual cure system; and then (c) irradiating the build region with light through said optically transparent member to form a solid polymer scaffold from the first component and also advancing (typically raising) the carrier away from the build surface to form a three-dimensional intermediate having the same shape as, or a shape to be imparted to, the three-dimensional object and containing said second solidifiable component (e.g., a second reactive component) carried in the scaffold in unsolidified and/or uncured form.

In some embodiments of bottom up or top down three dimensional fabrication as implemented in the context of the present invention, the build surface is stationary during the formation of the three dimensional intermediate; in other embodiments of bottom-up three dimensional fabrication as implemented in the context of the present invention, the build surface is tilted, slid, flexed and/or peeled, and/or otherwise translocated or released from the growing three dimensional intermediate, usually repeatedly, during formation of the three dimensional intermediate.

In some embodiments of bottom up or top down three dimensional fabrication as carried out in the context of the present invention, the polymerizable liquid (or resin) is maintained in liquid contact with both the growing three dimensional intermediate and the build surface during both the filling and irradiating steps, during fabrication of some of, a major portion of, or all of the three dimensional intermediate.

In some embodiments of bottom-up or top down three dimensional fabrication as carried out in the context of the present invention, the growing three dimensional intermediate is fabricated in a layerless manner (e.g., through multiple exposures or "slices" of patterned actinic radiation or light) during at least a portion of the formation of the three dimensional intermediate.

In some embodiments of bottom up or top down three dimensional fabrication as carried out in the context of the present invention, the growing three dimensional intermediate is fabricated in a layer-by-layer manner (e.g., through multiple exposures or "slices" of patterned actinic radiation or light), during at least a portion of the formation of the three dimensional intermediate.

In some embodiments of bottom up or top down three dimensional fabrication employing a rigid or flexible optically transparent window, a lubricant or immiscible liquid may be provided between the window and the polymerizable liquid (e.g., a fluorinated fluid or oil such as a perfluoropolyether oil).

From the foregoing it will be appreciated that, in some embodiments of bottom-up or top down three dimensional fabrication as carried out in the context of the present invention, the growing three dimensional intermediate is fabricated in a layerless manner during the formation of at least one portion thereof, and that same growing three dimensional intermediate is fabricated in a layer-by-layer manner during the formation of at least one other portion thereof. Thus, operating mode may be changed once, or on multiple occasions, between layerless fabrication and layer-by-layer fabrication, as desired by operating conditions such as part geometry.

In preferred embodiments, the intermediate is formed by continuous liquid interface production (CLIP). CLIP is known and described in, for example, PCT Applications Nos. PCT/US2014/015486 (published as U.S. Pat. No. 9,211,678 on Dec. 15, 2015); PCT/US2014/015506 (also published as U.S. Pat. No. 9,205,601 on Dec. 8, 2015); PCT/US2014/015497 (also published as US 2015/0097316, and to publish as U.S. Pat. No. 9,216,546 on Dec. 22, 2015), and in J. Tumbleston, D. Shirvanyants, N. Ermoshkin et al., Continuous liquid interface production of 3D Objects, *Science* 347, 1349-1352 (published online 16 Mar. 2015). In some embodiments, CLIP employs features of a bottom-up three dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone.

In some embodiments, the stable liquid interface may be achieved by other techniques, such as by providing an immiscible liquid as the build surface between the polymerizable liquid and the optically transparent member, by feeding a lubricant to the build surface (e.g., through an optically transparent member which is semipermeable thereto, and/or serves as a reservoir thereof), etc.

While the dead zone and the gradient of polymerization zone do not have a strict boundary therebetween (in those locations where the two meet), the thickness of the gradient of polymerization zone is in some embodiments at least as great as the thickness of the dead zone. Thus, in some embodiments, the dead zone has a thickness of from 0.01, 0.1, 1, 2, or 10 microns up to 100, 200 or 400 microns, or more, and/or the gradient of polymerization zone and the dead zone together have a thickness of from 1 or 2 microns up to 400, 600, or 1000 microns, or more. Thus the gradient of polymerization zone may be thick or thin depending on the particular process conditions at that time. Where the gradient of polymerization zone is thin, it may also be described as an active surface on the bottom of the growing three-dimensional object, with which monomers can react and continue to form growing polymer chains therewith. In some embodiments, the gradient of polymerization zone, or active surface, is maintained (while polymerizing steps continue) for a time of at least 5, 10, 15, 20 or 30 seconds, up to 5, 10, 15 or 20 minutes or more, or until completion of the three-dimensional product.

Inhibitors, or polymerization inhibitors, for use in the present invention may be in the form of a liquid or a gas. In some embodiments, gas inhibitors are preferred. In some embodiments, liquid inhibitors such as oils or lubricants may be employed. In further embodiments, gas inhibitors which are dissolved in liquids (e.g. oils or lubricants) may be employed. For example, oxygen dissolved in a fluorinated fluid. The specific inhibitor will depend upon the monomer being polymerized and the polymerization reaction. For free radical polymerization monomers, the inhibitor can conveniently be oxygen, which can be provided in the form of a gas such as air, a gas enriched in oxygen (optionally but in some embodiments preferably containing additional inert gases to reduce combustibility thereof), or in some embodiments pure oxygen gas. In alternate embodiments, such as where the monomer is polymerized by photoacid generator initiator, the inhibitor can be a base such as ammonia, trace amines (e.g. methyl amine, ethyl amine, di and trialkyl amines such as dimethyl amine, diethyl amine, trimethyl amine, triethyl amine, etc.), or carbon dioxide, including mixtures or combinations thereof.

The method may further comprise the step of disrupting the gradient of polymerization zone for a time sufficient to form a cleavage line in the three-dimensional object (e.g., at a predetermined desired location for intentional cleavage, or at a location in the object where prevention of cleavage or reduction of cleavage is non-critical), and then reinstating the gradient of polymerization zone (e.g. by pausing, and resuming, the advancing step, increasing, then decreasing, the intensity of irradiation, and combinations thereof).

CLIP may be carried out in different operating modes operating modes (that is, different manners of advancing the carrier and build surface away from one another), including continuous, intermittent, reciprocal, and combinations thereof.

Thus in some embodiments, the advancing step is carried out continuously, at a uniform or variable rate, with either constant or intermittent illumination or exposure of the build area to the light source.

In other embodiments, the advancing step is carried out sequentially in uniform increments (e.g., of from 0.1 or 1 microns, up to 10 or 100 microns, or more) for each step or increment. In some embodiments, the advancing step is carried out sequentially in variable increments (e.g., each increment ranging from 0.1 or 1 microns, up to 10 or 100 microns, or more) for each step or increment. The size of the increment, along with the rate of advancing, will depend in part upon factors such as temperature, pressure, structure of the article being produced (e.g., size, density, complexity, configuration, etc.).

In some embodiments, the rate of advance (whether carried out sequentially or continuously) is from about 0.1.1, or 10 microns per second, up to about to 100, 1,000, or 10,000 microns per second, again depending again depending on factors such as temperature, pressure, structure of the article being produced, intensity of radiation, etc.

In still other embodiments, the carrier is vertically reciprocated with respect to the build surface to enhance or speed the refilling of the build region with the polymerizable liquid. In some embodiments, the vertically reciprocating step, which comprises an upstroke and a downstroke, is carried out with the distance of travel of the upstroke being greater than the distance of travel of the downstroke, to thereby concurrently carry out the advancing step (that is, driving the carrier away from the build plate in the Z dimension) in part or in whole.

In some embodiments, the solidifiable or polymerizable liquid is changed at least once during the method with a subsequent solidifiable or polymerizable liquid (e.g., by switching a "window" or "build surface" and associated reservoir of polymerizable liquid in the apparatus); optionally where the subsequent solidifiable or polymerizable liquid is cross-reactive with each previous solidifiable or polymerizable liquid during the subsequent curing, to form an object having a plurality of structural segments covalently coupled to one another, each structural segment having different structural (e.g., tensile) properties (e.g., a rigid funnel or liquid connector segment, covalently coupled to a flexible pipe or tube segment).

Once the three-dimensional intermediate is formed, it may be removed from the carrier, optionally washed, any supports optionally removed, any other modifications optionally made (cutting, welding, adhesively bonding, joining, grinding, drilling, etc.), and then heated and/or microwave irradiated sufficiently to further cure the resin and form the three dimensional object. Of course, additional modifications may also be made following the heating and/or microwave irradiating step.

Washing may be carried out with any suitable organic or aqueous wash liquid, or combination thereof, including solutions, suspensions, emulsions, microemulsions, etc. Examples of suitable wash liquids include, but are not limited to water, alcohols (e.g., methanol, ethanol, isopropanol, etc.), benzene, toluene, etc. Such wash solutions may optionally contain additional constituents such as surfactants, etc. A currently preferred wash liquid is a 50:50 (volume:volume) solution of water and isopropanol. Wash methods such as those described in U.S. Pat. No. 5,248,456 may be employed and are included therein.

After the intermediate is formed, optionally washed, etc., as described above, it is then heated and/or microwave irradiated to further cure the same. Heating may be active heating (e.g., in an oven, such as an electric, gas, or solar oven), or passive heating (e.g., at ambient temperature). Active heating will generally be more rapid than passive heating and in some embodiments is preferred, but passive heating—such as simply maintaining the intermediate at ambient temperature for a sufficient time to effect further cure—is in some embodiments preferred.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075).

Microwave irradiation of the object for heating may be carried out at any suitable frequency, typically from 300 MHz to 300 GHz. In some embodiments, microwave irradiation of the object is carried out at a frequency of from 2,000 MHz to 4,000 MHz (2,450 MHz typically being employed in small or residential microwave ovens), or at a frequency of from 500 MHz to 1,500 MHz (915 MHz typically being employed in larger commercial or industrial microwave ovens).

The heating step may be carried out by multiple heating methods as is known in the art (e.g., a combination of two or more of radiant heating, microwave irradiating, convection heating, conduction heating, etc.)

In some embodiments, the heating step may be carried out in part or in whole by generating sufficient heat during an initial forming by photopolymerization step, where that photopolymerization step is an exothermic reaction.

It will be clear to those skilled in the art that the materials described in the current invention will be useful in other additive manufacturing techniques, including ink-jet printer-based methods.

3. Products.

The resins and methods described herein are useful for, among other things, making three-dimensional objects that have high tensile strength, high scratch resistance, high glass transition temperatures, good chemical resistance, and/or are good insulators. In some embodiments, the resins and methods described herein are used to fasteners; electronic device housings; gears, propellers, and impellers; wheels, mechanical device housings; tools, etc. "Fastener" includes, but is not limited to, nuts, bolts, screws, expansion fasteners, clips, buckles, etc. "Electronic device housing" includes, but is not limited to, partial and complete cell phone housings, tablet computer housings, personal computer housings, electronic recorder and storage media housings, video monitor housings, keyboard housings, etc. "Mechanical device housing" includes, but is not limited to, partial and complete gear housings, pump housings, motor housings, etc.

In the Examples set forth below, the following reagents are used, except where indicated otherwise.

Epoxy: Araldite® GY 6010 bisphenol A epoxy liquid resin, available from Huntsman Advanced Materials Americas, 10003 Woodloch Forest Drive, The Woodlands, Tex. 77380 USA. This generally has the structure:

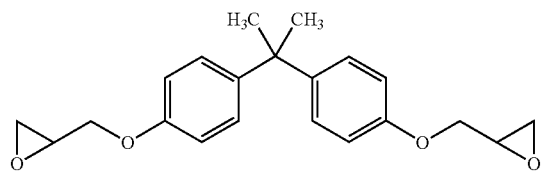 [SMILES: CC(C)(c1ccc(OCC2CO2)cc1)c1ccc(OCC2CO2)cc1]

Hardener: Jeffamine D230, a polyetheramine characterized by repeating oxypropylene units in the backbone, available from Huntsman Corp. 10003 Woodloch Forest Drive, The Woodlands, Tex. 77380 USA. This generally has the structure:

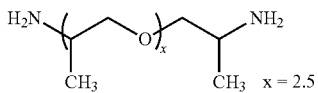

Urethane Acrylate: Sartomer CN983 urethane acrylate, an aliphatic polyester based urethane diacrylate oligomer available from Sartomer Americas, 502 Thomas Jones Way, Exton, Pa. 19341 USA.

Diluent: Sartomer SR231 diethylene glycol dimethacrylate, available from Sartomer Americas, 502 Thomas Jones Way, Exton, Pa. 19341 USA. This generally has the structure:

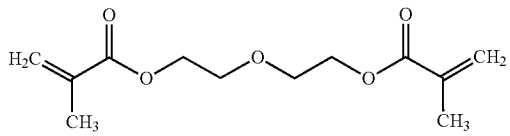 [SMILES: C=C(C)C(=O)OCCOCCOC(=O)C(=C)C]

Acrylated BPA epoxide: Sartomer CN153 epoxy acrylate oligomer, an epoxy acrylate oligomer that has both acrylate and epoxy functionality on the same backbone, available from Sartomer Americas, 502 Thomas Jones Way, Exton, Pa. 19341 USA. This generally has the structure:

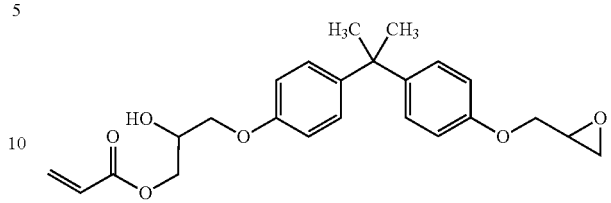

Photoinitiator: IRGACURE® TPO diphenyl(2,4,6,-trimethylbenzoyl)phosphine oxide photoinitiator, available from BASF Corporation, 100 Park Avenue, Florham Park, N.J. 07932 USA. This generally has the structure:

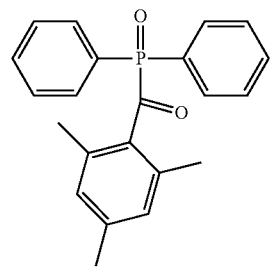 [SMILES: Cc1cc(C)c(C(=O)P(=O)(c2ccccc2)c2ccccc2)c(C)c1]

Example 1

Aromatic Amine Hardener Resin and Product

In this example, the hardener is 4,4'-Methylenebis(2,6-diethylaniline) (MDEA), an aromatic amine, which has the structure:

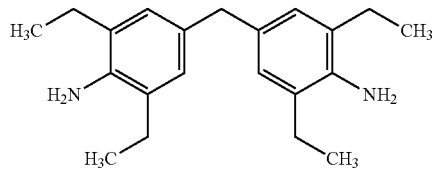 [SMILES: CCc1cc(Cc2cc(CC)c(N)c(CC)c2)cc(CC)c1N]

A resin composition containing the foregoing hardener was produced having the composition given in Table 1 below:

TABLE 1

Aromatic amine hardener resin.

| Component | Name | Approx % by weight |
|---|---|---|
| Epoxy | Huntsman Araldite GY 6010 | 30 |
| Hardener | MDEA | 20 |
| Urethane Acrylate | Sartomer CN983 | 25 |
| Diluent | Sartomer SR 231 (diethylene glycol dimethacrylate) | 18 |
| Acrylated BPA epoxy | Sartomer CN153 | 6 |
| Photoinitiator | Irgacure™ 369 | 1 |

Sartomer products are available from Sartomer Americas, 502 Thomas Jones Way, Exton, Pa. 19341 USA. Irgacure™ 369 is a product of Ciba Specialty Chemicals. Huntsman products are available from Huntsman Advanced Materials Americas, 10003 Woodloch Forest Drive, The Woodlands, Tex. 77380 USA.

A three-dimensional intermediate object was produced from the resin of Table 1 by Continuous Liquid Interface Production (CLIP). In this process, the shape of the intermediate object is determined or "locked in" when the UV curable components react. Then, the epoxy and MDEA components are believed to react in a second heating step inside the part by the mechanism described in Scheme 1 below.

Three-dimensional intermediate objects were produced from the resin system of Table 2 by CLIP, with the shape of the object being "locked in" by UV light as described in Example 1. The epoxy and Jeffamine D230 react in a second heating cure step by the same mechanism in Example 1. An example cure schedule for this system is 80° C. for 2 hours followed by 125° C. for 3 hours.

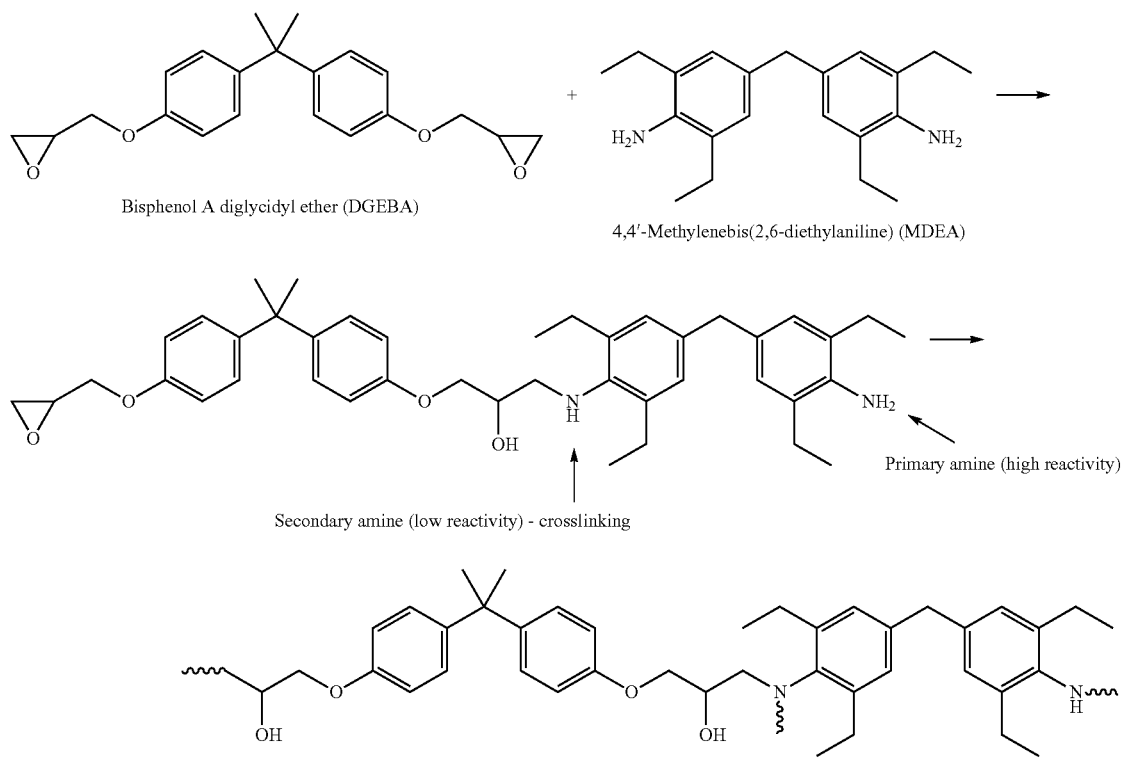

Scheme 1

Bisphenol A diglycidyl ether (DGEBA)

4,4'-Methylenebis(2,6-diethylaniline) (MDEA)

Primary amine (high reactivity)

Secondary amine (low reactivity) - crosslinking

A typical heat curing schedule for an intermediate object produced with the foregoing system is 2 hours at 180° C.

Example 2

Polyether Amine Hardener Resin and Product

In this example the hardener is a polyether amine, specifically Jeffamine D230™ (available from Huntsman Petrochemical Co.), the structure of which is given above. A resin system containing this hardener was produced with the composition given in Table 2 below.

TABLE 2

Polyether amine hardener resin.

| Component | Name | % by weight |
|---|---|---|
| Epoxy | Huntsman Araldite GY 6010 | 12.5 |
| Hardener | Jeffamine D230 | 7 |
| Urethane Acrylate | Sartomer CN983 | 40 |
| Diluent | Sartomer SR 231 | 30 |
| Acrylated BPA epoxy | Sartomer CN153 | 10 |
| Photoinitiator | TPO | 0.5 |

Example 3

Anhydride Hardener Resin and Product

In this example, the hardener is an anhydride with an accelerator present to speed the cure. Structures of the anhydride (methyl tetrahydrophthalic anhydride, MTHPA) and the accelerator (benzyldimethylamine, BDMA) are shown below.

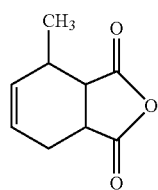

MTHPA

-continued

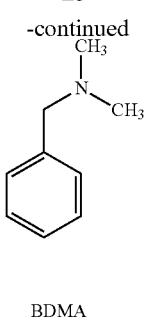

BDMA

A resin system containing this hardener and accelerator was produced having the composition given in Table 3 below.

Three dimensional intermediate objects were produced from the resin of Table 3 by CLIP, essentially as described in Examples 1-2 above. In this example, the epoxy and anhydride are believed to react at high temperature in a mechanism detailed by DOW chemical as shown in Scheme 2 below.

TABLE 3

Anhydride hardener resin.

| Component | Name | Approx. % by weight |
|---|---|---|
| Epoxy | Huntsman Araldite GY 6010 | 10 |
| Hardener | MTHPA | 9 |
| Accelerator | BDMA | 0.5 |
| Urethane Acrylate | Sartomer CN983 | 40 |
| Diluent | Sartomer SR 231 | 30 |
| Acrylated BPA epoxy | Sartomer CN153 | 10 |
| Photoinitiator | TPO | 0.5 |

A. Opening of the Anhydride Ring with a Hydroxyl to Form the Monoester

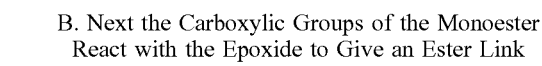

B. Next the Carboxylic Groups of the Monoester React with the Epoxide to Give an Ester Link

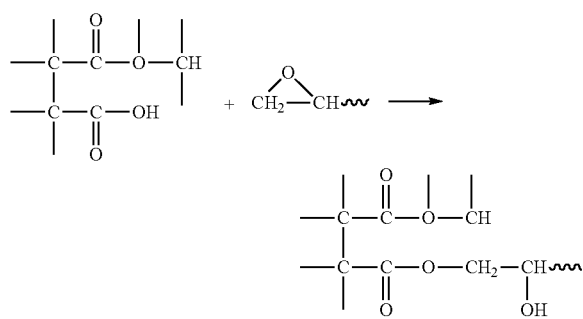

C. Next, the Epoxide Groups React with Hydroxyl Groups, Catalyzed by the Carboxylic Acid, to Give an Ether Linkage Scheme 2

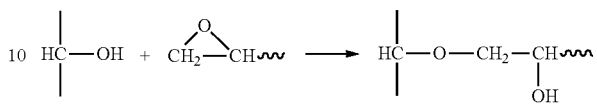

An example cure schedule for this system is 90° C. for 2 hours followed by 150° C. for 4 hours.

Examples 4-6

Improved Products from Resins Further Containing an Acrylated Epoxy

Addition of the acrylated epoxy CN153 (available from Sartomer Americas) to each of the resin compositions given in Examples 1-3 above chemically connects the UV and epoxy networks through it's dual functionality during production of the three-dimensional object by CLIP. Compared to identical formulations without the component, addition of CN153 to the resins described above (at about three percent by weight in each of the formulations described above), reduces cracking with the aromatic amine and anhydride hardener systems, and reduces phase separation (as evidenced by opacity during printing) with the polyether amine hardener system, as shown in FIGS. 1-3.

Example 7

Resin Viscosity and Product Properties

Resins as described herein above typically have a viscosity of from 100 or 200 to 10,000 or 20,000 Centipoise, or more, at room temperature (e.g., 25° C.).

Three-dimensional objects produced by CLIP from resins such as those described herein above typically have properties as given in Table 4 below.

TABLE 4

Product properties.

| | |
|---|---|
| Tensile Strength | 50 or 70 MPa to 100 or 200 MPa |
| Modulus | 2,000 or 3,000 MPa to 5,000 or 7,000 MPa |
| Elongation | 5 to 10% |
| Impact Strength | 40 or 50 to 70 or 100 J/m |
| Glass transition temperature | 50 or 60 to 100 or 120° C. |

Example 8

Tough Epoxy Formulation Using a Core-Shell Rubber Filler

This resin formulation was made to produce products having higher elongation while maintaining a relatively high modulus by adding a core-shell rubber (CSR) modifier and switching the diluent to the more flexible poly(ethylene glycol) dimethacrylate. The modifier is available from Kaneka pre-dispersed in DGEBA epoxy resin.

TABLE 5

Resin formulation.

| Component | Name | % by weight |
|---|---|---|
| CSR-modified Epoxy | MX170 | 12.5 |
| Hardener | Jeffamine D230 | 7 |
| Urethane Acrylate | Sartomer CN983 | 40 |
| Diluent | Sartomer SR 210 | 30 |
| Acrylated BPA epoxy | Sartomer CN153 | 10 |
| Photoinitiator | TPO | 0.5 |

Typical properties of products with the resin by bottom up three dimensional fabrication (particularly CLIP) followed by a heat cure as described above are as follows:

TABLE 6

Resin and Product properties.

| Resin viscosity | 750 cP |
|---|---|
| Tensile Strength | 50-60 MPa |
| Modulus | 2500-3500 MPa |
| Elongation | 20-40% |
| Impact Strength | 40-60 J/m |
| Glass transition temp | 60-80° C. |

Example 9

High Temperature Epoxy Formulation Including a Latent Hardener

In this example the hardener is an aromatic amine, diamino diphenylsulfone (DDS). DDS is commonly used to cure epoxy and achieve high Tg materials in other applications. The DDS used is a micropulverized solid and dispersed in the resin. The cure schedule is a ramped cure schedule as described previously.

TABLE 7

Resin formulation.

| Component | Name | % by weight |
|---|---|---|
| Epoxy | MX153 | 46.5 |
| Hardener | Aradur 9664-1 | 9.5 |
| Urethane Acrylate | Sartomer CN983 | 18.5 |
| Diluent | Sartomer SR 248 | 24 |
| Photoinitiator | TPO | 1.5 |

Typical properties of products produced with the resin by bottom up three dimensional fabrication (particularly CLIP) followed by a heat cure as described above are as follows:

TABLE 8

Resin and Product properties.

| Resin viscosity | 6000 cP |
|---|---|
| Tensile Strength | 60-80 MPa |
| Modulus | 3000-4500 MPa |
| Elongation | 3-8% |
| Impact Strength | TBD |
| Glass transition temp | 150-190° C. |

The foregoing is illustrative of the present invention, and is not to be construed as limiting thereof. The invention is defined by the following claims, with equivalents of the claims to be included therein.

We claim:

1. A method of forming a three-dimensional object, comprising:
   (a) providing an epoxy dual cure resin;
   (b) forming a three-dimensional intermediate from said epoxy dual cure resin, wherein said three-dimensional intermediate is formed in a layerless or layer-by-layer manner through multiple exposures of the epoxy dual cure resin to patterned actinic radiation or light, and
   where said three-dimensional intermediate has the shape of, or a shape to be imparted to, said three-dimensional object; then
   (c) optionally washing the three-dimensional intermediate, and
   (d) heating and/or microwave irradiating said three-dimensional intermediate sufficiently to further cure said epoxy dual cure resin and form said three-dimensional object;
   wherein said epoxy dual cure resin comprises:
   (i) a photoinitiator;
   (ii) monomers and/or prepolymers that are polymerizable by exposure to actinic radiation or light;
   (iii) optionally, a light absorbing pigment or dye;
   (iv) an epoxy resin;
   (v) an organic hardener co-polymerizable with said epoxy resin;
   (vi) optionally a dual reactive compound having substituted thereon a first reactive group reactive with said monomers and/or prepolymers that are polymerizable by exposure to actinic radiation or light, and a second reactive group reactive with said epoxy resin;
   (vii) optionally a diluent;
   (viii) optionally a filler; and
   (ix) optionally, a co-monomer and/or a co-prepolymer.

2. The method of claim 1, wherein said epoxy resin comprises a bisphenol A epoxy resin, a bisphenol F epoxy resin, a novolac epoxy resin, an aliphatic epoxy resin, a glycidylamine epoxy resin, an epoxidized vegetable oil, or a combination thereof.

3. The method of claim 1, wherein said organic hardener comprises an amine, an acid, a phenol, and/or an alcohol.

4. The method of claim 1, wherein said organic hardener comprises an anhydride.

5. The method of claim 1, wherein said organic hardener comprises a latent hardener, optionally included in said epoxy dual cure resin in solid particulate form.

6. The method of claim 1, wherein said monomers and/or prepolymers polymerizable by exposure to actinic radiation or light comprise reactive end groups selected from the group consisting of acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

7. The method of claim 1, wherein said light absorbing pigment or dye is present and is:
   (i) titanium dioxide,
   (ii) carbon black, and/or
   (iii) an organic ultraviolet light absorber.

8. The method of claim 1, wherein said diluent is present and comprises an acrylate, a methacrylate, a styrene, an acrylic acid, a vinylamide, a vinyl ether, a vinyl ester, polymers containing any one or more of the foregoing, or a combination of two or more of the foregoing.

9. The method of claim 1, wherein said filler is present and comprises a core-shell rubber.

10. The method of claim 1, wherein said epoxy dual cure resin comprises:
  (i) from 0.1 to 4 percent by weight of said photoinitiator,
  (ii) from 10 to 90 percent by weight of said monomers and/or prepolymers that are polymerizable by exposure to actinic radiation or light,
  (iii) from 0.1 to 2 percent by weight of said light absorbing pigment or dye when present,
  (iv) from 2 to 60 percent by weight of said epoxy resin;
  (v) from 1 to 30 percent by weight of said organic hardener;
  (vi) from 1 to 40 percent by weight of said dual reactive compound when present;
  (vii) from 1 to 40 percent by weight of said diluent when present; and
  (viii) from 1 to 50 percent by weight of said filler when present.

11. The method of claim 1, wherein said forming step is carried out by additive manufacturing.

12. The method of claim 1, wherein said forming step is carried out by either bottom-up three-dimensional fabrication between a carrier and a build surface, or top-down three-dimensional fabrication between a carrier and a fill level.

13. The method of claim 1, wherein said forming step is carried out by continuous liquid interface production (CLIP).

14. The method of claim 13, wherein said forming step is carried out between a carrier and a build surface, and said method further comprises vertically reciprocating said carrier with respect to the build surface to enhance or speed the refilling of a build region with the epoxy dual cure resin.

15. The method of claim 1, wherein said three-dimensional object comprises a polymer blend, interpenetrating polymer network, semi-interpenetrating polymer network, or sequential interpenetrating polymer network.

16. The method of claim 1, wherein said heating and/or microwave irradiating step is carried out at at least a first temperature and a second temperature,
  with said first temperature greater than ambient temperature, said second temperature greater than said first temperature, and said second temperature less than 300° C.

17. An epoxy dual cure resin useful for additive manufacturing of three-dimensional objects, comprising:
  (i) a photoinitiator;
  (ii) monomers and/or prepolymers that are polymerizable by exposure to actinic radiation or light, wherein said monomers and/or prepolymers are present in the epoxy dual cure resin in an amount of from 10 to 90 percent by weight;
  (iii) optionally, a light absorbing pigment or dye;
  (iv) an epoxy resin present in the epoxy dual cure resin an amount of from 10 to 60 percent by weight;
  (v) an organic hardener co-polymerizable with said epoxy resin, wherein said organic hardener comprises an anhydride and is present in the epoxy dual cure resin in an amount of from 1 to 30 percent by weight;
  (vi) optionally a dual reactive compound having substituted thereon a first reactive group reactive with said monomers and/or prepolymers that are polymerizable by exposure to actinic radiation or light, and a second reactive group reactive with said epoxy resin;
  (vii) optionally a diluent;
  (viii) optionally a filler; and
  (ix) optionally, a co-monomer and/or a co-prepolymer.

18. The epoxy dual cure resin of claim 17, wherein said epoxy resin comprises a bisphenol A epoxy resin, a bisphenol F epoxy resin, a novolac epoxy resin, an aliphatic epoxy resin, a glycidylamine epoxy resin, an epoxidized vegetable oil, or a combination thereof.

19. The epoxy dual cure resin of claim 17, wherein said organic hardener further comprises an amine, an acid, a phenol, an alcohol, and/or a thiol.

20. The epoxy dual cure resin of claim 17, wherein said organic hardener further comprises a latent hardener.

21. The epoxy dual cure resin of claim 17, wherein said monomers and/or prepolymers polymerizable by exposure to actinic radiation or light comprise reactive end groups selected from the group consisting of acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

22. The epoxy dual cure resin of claim 17, wherein said light absorbing pigment or dye is present and is:
  (i) titanium dioxide,
  (ii) carbon black, and/or
  (iii) an organic ultraviolet light absorber.

23. The epoxy dual cure resin of claim 17, wherein said diluent is present and comprises an acrylate, a methacrylate, a styrene, an acrylic acid, a vinylamide, a vinyl ether, a vinyl ester, polymers containing any one or more of the foregoing, or a combination of two or more of the foregoing.

24. The epoxy dual cure resin of claim 17, wherein said filler is present and comprises a core-shell rubber.

25. The epoxy dual cure resin of claim 17, wherein said epoxy dual cure resin comprises:
  (i) from 0.1 to 4 percent by weight of said photoinitiator,
  (ii) from 0.1 to 2 percent by weight of said light absorbing pigment or dye when present,
  (iii) from 1 to 40 percent by weight of said dual reactive compound when present;
  (iv) from 1 to 40 percent by weight of said diluent when present; and
  (v) from 1 to 50 percent by weight of said filler when present.

26. A product produced by a method of claim 1.

27. An intermediate product produced by a method comprising
  (a) providing an epoxy dual cure resin; and
  (b) forming a three-dimensional intermediate from said epoxy dual cure resin, wherein said three-dimensional intermediate is formed in a layerless or layer-by-layer manner through multiple exposures of the epoxy dual cure resin to patterned actinic radiation or light, and where said three-dimensional intermediate has the shape of, or a shape to be imparted to, a three-dimensional object;
  wherein said epoxy dual cure resin comprises:
  (i) a photoinitiator;
  (ii) monomers and/or prepolymers that are polymerizable by exposure to actinic radiation or light;
  (iii) optionally, a light absorbing pigment or dye;
  (iv) an epoxy resin;
  (v) an organic hardener co-polymerizable with said epoxy resin;
  (vi) optionally a dual reactive compound having substituted thereon a first reactive group reactive with said monomers and/or prepolymers that are polymerizable by exposure to actinic radiation or light, and a second reactive group reactive with said epoxy resin;
  (vii) optionally a diluent;
  (viii) optionally a filler; and
  (ix) optionally, a co-monomer and/or a co-prepolymer.

28. The method of claim 1, wherein said dual reactive compound is present and comprises a compound of the formula: $(X)_n R(X')_m$, wherein:
- X is the first reactive group and is selected from the group consisting of acrylate, methacrylate, α-olefin, N-vinyl, acrylamide, methacrylamide, styrenic, thiol, 1,3-diene, vinyl halide, acrylonitrile, vinyl ester, maleimide, and vinyl ether reactive groups, and combinations thereof;
- X' is the second reactive group and is selected from the group consisting of epoxy, amine, isocyanate, alcohol, and anhydride reactive groups, and combinations thereof;
- n and m are each independently an integer of from 1 to 20, and
- R is a hydrocarbyl group.

29. The method of claim 1, wherein said organic hardener comprises one or more linear and/or cyclic anhydride(s) selected from the group consisting of polysebacic anhydride; polyazelaic anhydride; methyltetrahydrophthalic anhydride; tetrahydro phthalic anhydride; methyl nadic anhydride; hexahydro phthalicanhydride; methylhexahydro phthalic anhydride; succinic anhydride; substituted succinic anhydride; citric acid anhydride; maleic anhydride; adducts of maleic anhydride; dodecyl succinic anhydride; vinyl and styrene copolymers of maleic anhydride; a multi-ring alicyclic anhydride; phthalic anhydride; and trimellitic anhydride.

30. The epoxy dual cure resin of claim 17, wherein said organic hardener comprises one or more linear and/or cyclic anhydride(s) selected from the group consisting of polysebacic anhydride; polyazelaic anhydride; methyltetrahydrophthalic anhydride; tetrahydro phthalic anhydride; methyl nadic anhydride; hexahydro phthalicanhydride; methylhexahydro phthalic anhydride; succinic anhydride; substituted succinic anhydride; citric acid anhydride; maleic anhydride; adducts of maleic anhydride; dodecyl succinic anhydride; vinyl and styrene copolymers of maleic anhydride; a multi-ring alicyclic anhydride; phthalic anhydride; and trimellitic anhydride.

31. The epoxy dual cure resin of claim 17, wherein, when cured, the epoxy dual cure resin produces a polymer product having a glass transition temperature in a range of 60 to 80° C.

* * * * *